United States Patent [19]

Higginbotham, Jr. et al.

[11] Patent Number: 4,571,587

[45] Date of Patent: Feb. 18, 1986

[54] DIGITAL INTERFACE SELECTOR

[75] Inventors: James M. Higginbotham, Jr., Newark; Eugene C. Varasso, Heath; Kenneth L. Rapp, Granville; Thomas H. Sunkle, Newark, all of Ohio

[73] Assignee: Owens-Corning Fiberglas Corporation, Toledo, Ohio

[21] Appl. No.: 402,680

[22] Filed: Jul. 28, 1982

[51] Int. Cl.4 ...................... H04Q 11/00; G08C 15/00
[52] U.S. Cl. ........................... 340/825.53; 340/870.03; 340/870.13
[58] Field of Search ........... 340/825.5, 825.52, 870.03, 340/870.13, 825.53

[56] References Cited

U.S. PATENT DOCUMENTS 3,706,086 12/1972 Farnsworth .................... 340/870.13
3,986,169 10/1976 Kobayashi et al. ............ 340/825.52
4,035,772 7/1977 Abe et al. ........................ 340/870.03

Primary Examiner—Donald J. Yusko
Attorney, Agent, or Firm—Ronald C. Hudgens; Patrick P. Pacela; Ronald E. Champion

[57] ABSTRACT

An interface selector connecting a plurality of field digital devices to a single digital receiving device is disclosed. The interface selector provides a means for the digital receiving device to select which field digital device is to transmit valid data. Circuitry is provided to disable all other field digital devices. Signal lines are provided for the digital receiving device to verify that only one field digital device is transmitting data. Circuitry is also provided to prevent transmission of data if all field digital devices are selected simultaneously.

9 Claims, 8 Drawing Figures

DIGITAL INTERFACE SELECTOR

TECHNICAL FIELD

This invention relates to a Digital Interface Selector which allows a plurality of field digital devices to be connected to a single digital receiving device. The digital receiving device can use the Digital Interface Selector to select which field digital device's output will be read by the digital receiving device.

BACKGROUND ART

Digital receiving devices such as computers and microprocessors or other data receiving or manipulation devices normally have a set number of data input lines. When the field digital devices' data lines exceed the number of data input lines, some sort of selection or switching is necessary. Mechanical switching is cumbersome, slow and unreliable. Electronic switching is available, but speed of switching and errors during switching also present a problem. It is known that field digital devices which have diode-transistor logic (DTL) or transistor-transistor logic (TTL) type outputs can have these outputs hard wired together to produce an AND wired logic. Additional circuitry is still required in order to select and verify which device is producing valid data signals when several devices are hard wired together. The present invention overcomes these problems by allowing a digital receiving device to produce a signal which can select a specific field digital device and then verifying that this device is producing a valid signal.

DISCLOSURE OF INVENTION

This device connects a multitude of field digital devices to a single processor which has a single channel input sufficient for only one field digital device. The field devices are binary coded decimal digital devices which use a gate for activating each decade of the binary coded decimal number system and which use open collector DTL or TTL outputs. The purpose of the device is to connect a multitude of binary coded decimal digital indicating devices in an AND wired configuration under the control of a single microprocessor which then selects which of the field digital devices to read. This section will describe how the device works when connected to a single computer input which controls three digital indicators, such as Toledo Scale's Model 8130. This explanation is not to limit this application to the specific device or to the specific number of devices described but merely will indicate in general terms how the interface device operates. In order to understand the operation of the digital interface device, it is necessary to understand the types of outputs which are given by the field digital device, such as the Toledo Scale Digital Indicator Model 8130. The field digital device gives binary coded decimal signals on parallel output lines. For each decade of binary coded decimal, a gate controls whether or not that decade will be transmitted onto the interface line. For the units decade of the binary coded decimal, there are four data lines available. These lines read either 0 volts or a positive voltage indicating whether or not that portion of the binary coded decimal is to be transmitted. In binary coded decimal configuration in the units decade, one line indicates the number 1, a second line indicates the number 2, the third line indicates the number 4, and the fourth line indicates a number 8. When a conductive output or a voltage is impressed upon the output for that specific line, that indicates that number is being read. For instance, for a number 6, the second and third lines would be conductive such that the binary coded decimal 2 and the binary coded decimal 4 are conductive. The binary coded decimal 1 and the binary coded decimal 8 are not conductive. The gate which controls the units decade of the binary coded decimal is such that when the gate is grounded, then all four lines conduct, which indicates a binary coded decimal number 15 for the units decade which is an impossible number. Only numbers 0 through 9 are valid numbers for the units decade for the binary coded decimal. Similarly, the tens, hundreds and thousands decades are operated in a similar manner. In a configuration wherein there are thousands, hundreds, tens and units decades, there would be 4 data lines per decade for a total of 16 data lines. Similarly, there would be one gate line per decade for a total of four gates. The gates in this particular configuration are wired together such that either all decades will transmit valid numbers or all decades transmit a positive voltage conduct based upon whether or not the gate lines are grounded or allowed to float above ground. When all of the gates to a particular field digital indicator are grounded, then all outputs go to a high voltage of approximately plus 5 volts. This indicates that the device is not reading any information but is in an off position. The outputs from multiple devices are wired together in an AND configuration. In order to select the reading from a specific field digital device, all the other field digital devices gates are grounded. The digital field device for which a reading is desired is allowed to float above ground. Since all of the devices are wired together in an AND configuration, then the low voltage or specific binary coded decimal unit is impressed on the line and takes precedence over the high voltage. The total line, which is a summation of all the devices connected together, will only read low if any one particular line reads low. If all the lines read high, then and only then will the output line read high. The English equivalent is "the output of AND wired logic assumes the 1 state if and only if all of the inputs assume the 1 state." In addition to the 16 binary coded decimal data lines and the 4 gate lines, the field digital device also has a line to indicate whether or not the reading is a positive or negative number. There is also provided a power ground line such that the field digital device ground and the ground for the interface device are at the same level. The control unit, which accepts the data from the digital interface, can be a microprocessor, a microcomputer, a minicomputer or a main frame computer. The configuration of the input to this device consists of a scale select line for each digital field device which indicates whether or not the data being received is a positive or a negative number. The 16 data lines, which are for the thousands, hundreds, tens and units decades of the binary coded decimal units, are provided to input to the control device. A separate line is also provided for each digital field device to verify which digital field device has been selected by the microprocessor, microcomputer, minicomputer or main frame computer. A separate line for each digital field device is also provided to select which device will be feeding information to the digital interface and then to the digital receiving device. In a steady state condition when no digital field devices are selected, the digital receiving device is providing a signal above ground to each of the select lines.

When a particular digital field device is required to be read, then the digital receiving device grounds the select input for that particular device allowing the device to transmit a valid binary coded decimal signal. Circuitry is provided to disable all decades of output if the digital receiving device mistakenly actuates all scale select lines.

BEST MODE FOR CARRYING OUT INVENTION

The digital interface selector allows a plurality of field digital devices to be connected to a single digital receiving device wherein the choice of which field digital device will be read is under the control of the digital receiving device.

Figure 1:
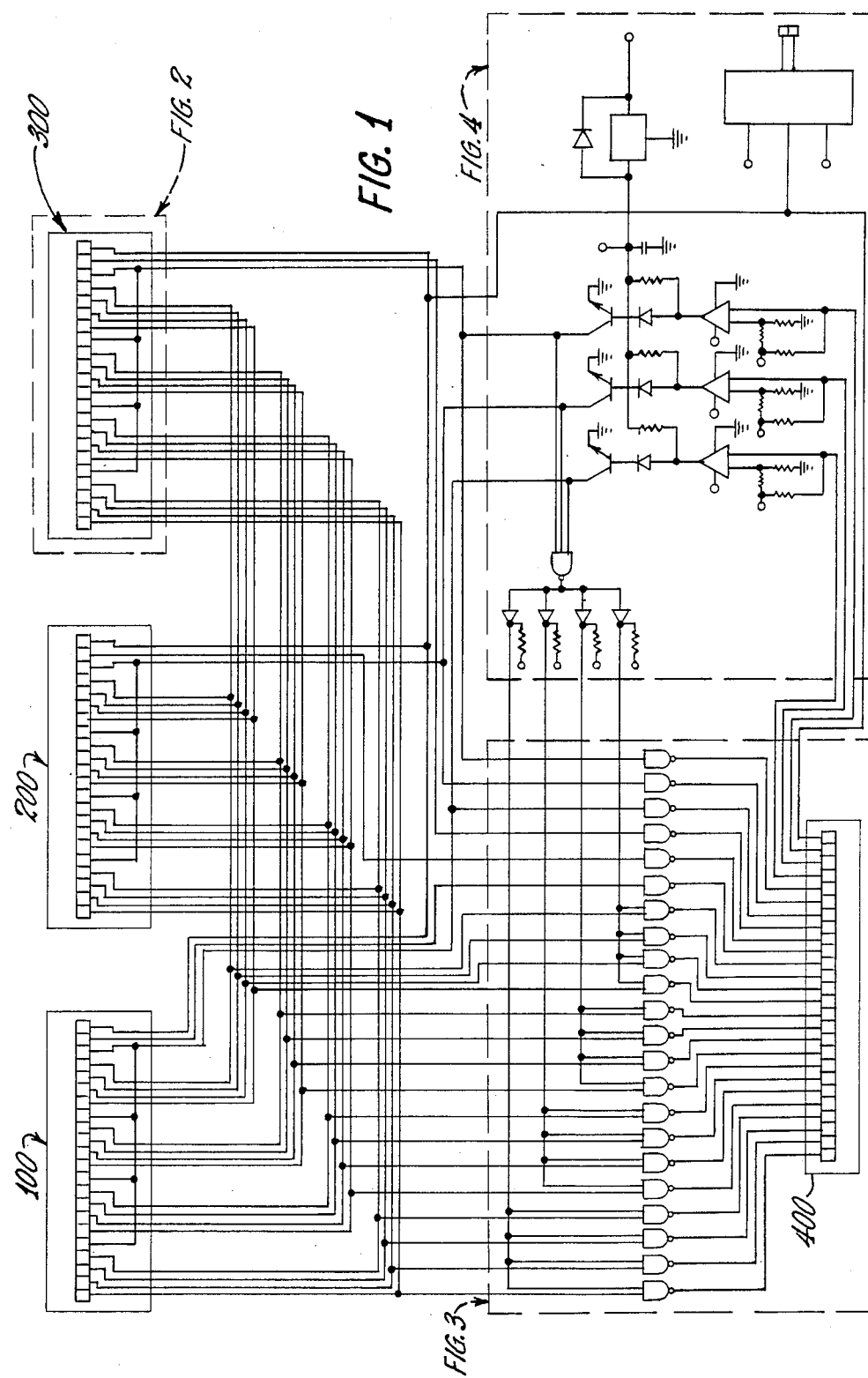
FIG. 1 is an overall circuit diagram of the Digital Interface Selector showing input and output connectors.

FIG. 1 is a circuit diagram showing a preferred embodiment of the digital interface selector. Item 100 is the connector for the first field digital device. Item 200 is the connector for the second field digital device and item 300 is the connector for the third field digital device. Item 400 is the connector for the digital receiving device.

Figure 2:
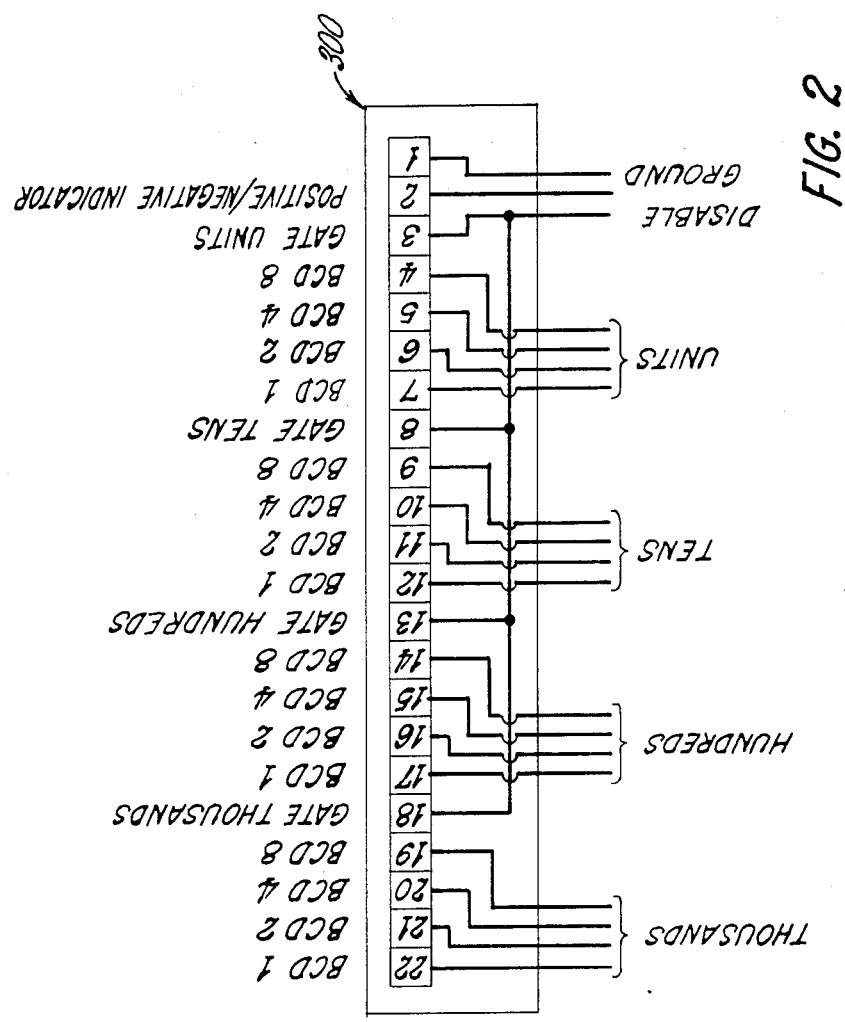
FIG. 2 is a drawing of the connections to the field digital device.
Figure 7:
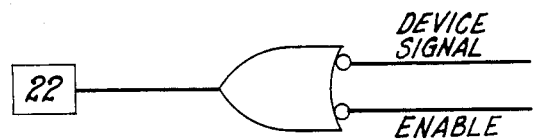
FIG. 7 shows a schematic of a typical type output from the field digital device.

FIG. 2 shows the signals which can be fed to the connector by the field digital device. The configuration shown in FIG. 2 has four decades of binary coded decimals available. The field digital device will impress a positive voltage on the pin for which a number is being transmitted. All other pins will be a ground sink for numbers which are not being transmitted. The last output element of the circuitry of the field digital device is shown in FIG. 7. This is a dual inverted input OR gate and is one quarter of a quad 2 input gate similar to an 8 4 6 device. FIG. 7 shows this output going to pin 22 which would be the binary coded decimal 1 of the thousandths decade. All other binary coded decimal data lines have a similar input from the field digital device. There are in this configuration four decades of numbers which can be read which include thousands, hundreds, tens and units. Within each decade four pins are available for indicating whether a binary coded decimal number 1, 2, 4, or 8 is indicated. Referring to the units decade, pin number 4, when a five volt signal is impressed upon it, indicates a binary coded decimal 8 is being transmitted. Pin 5 similarly indicates a binary coded decimal number 4, pin 6 a binary coded decimal number 2; and pin 7 a binary coded decimal 1. In order to transmit a number 6 on the units decade, pin number 5 would have five volts impressed upon it indicating a binary coded decimal 4 and pin 6 would have plus 5 volts impressed upon it indicating a binary coded decimal 2. The four and the two give us a binary coded decimal 6. Pin number 4 and pin number 7, when this number 6 is being transmitted, are connected to ground. Pins 3, 8, 13 and 18, which are the gates for each of the decades are connected together to a disable line. When the field digital device is to be disabled, the disable line is grounded which grounds pins 3, 8, 13 and 18. When this occurs. all of the signal lines for the binary coded decimals transmit plus 5 volts. This would give an impossible number for each of the decades including thousands, hundreds, tens and units, because the binary coded decimal 8, 4, 2, and 1 added together would give a number 15, which is an impossible number. Only numbers zero through 9 are valid numbers. The field digital device also has a line labeled pin number 2 in FIG. 2 which gives an indication of whether the number being transmitted is a positive or a negative number. A pin number 1 is also provided as a ground such that all the devices are at a common ground.

FIG. 1 shows how each binary coded decimal digit for each decade of each field digital device is hard-wired to the corresponding binary coded decimal digit of the other field digital devices. Looking at the binary coded decimal digit 1 of the thousands decade, pin 22 of connector 300 in FIG. 2, we can see from FIG. 1 that this would be wired to the corresponding pin 22 of connectors 100 and 200. The signal from this common wired connection would go to NAND gate 51 of FIG. 3 (binary coded decimal 1 of the thousands digit. A positive five volts (+5 V) would be impressed on gate 51 if and only if all three pins 22 signals were +5 volts. In all other conditions the signal to gate 51 would be ground. This condition exists because the DTL output device of the field digital device as shown in FIG. 7 will provide +5 volts if it is enabled but will pull its output to ground if it is disabled. Therefore, any +5 volt signal on the hard wired circuit will be pulled to ground if any of the devices are disabled.

Figure 3:
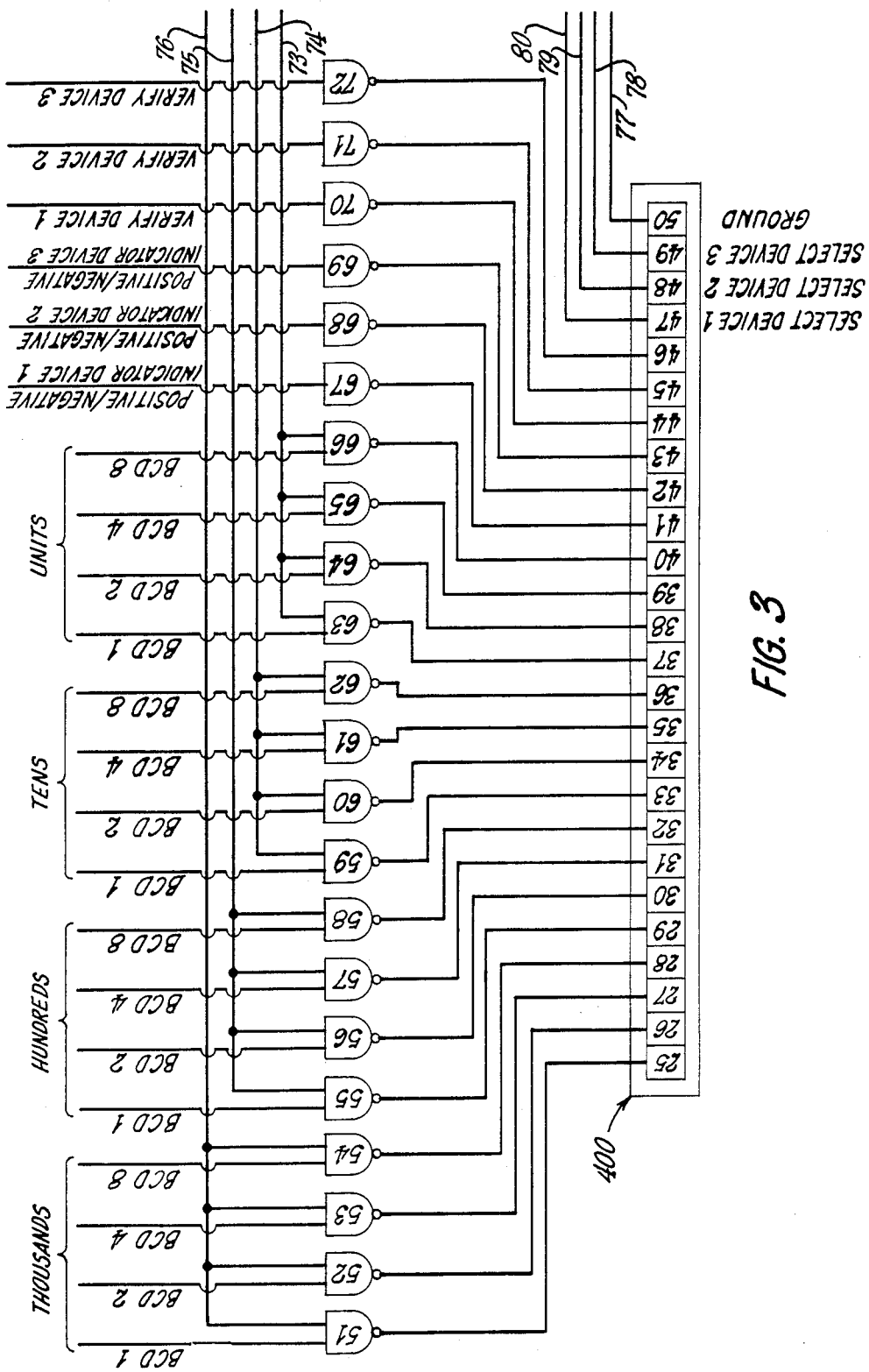
FIG. 3 the output gates and input connector to the digital receiving device.
Figure 4:
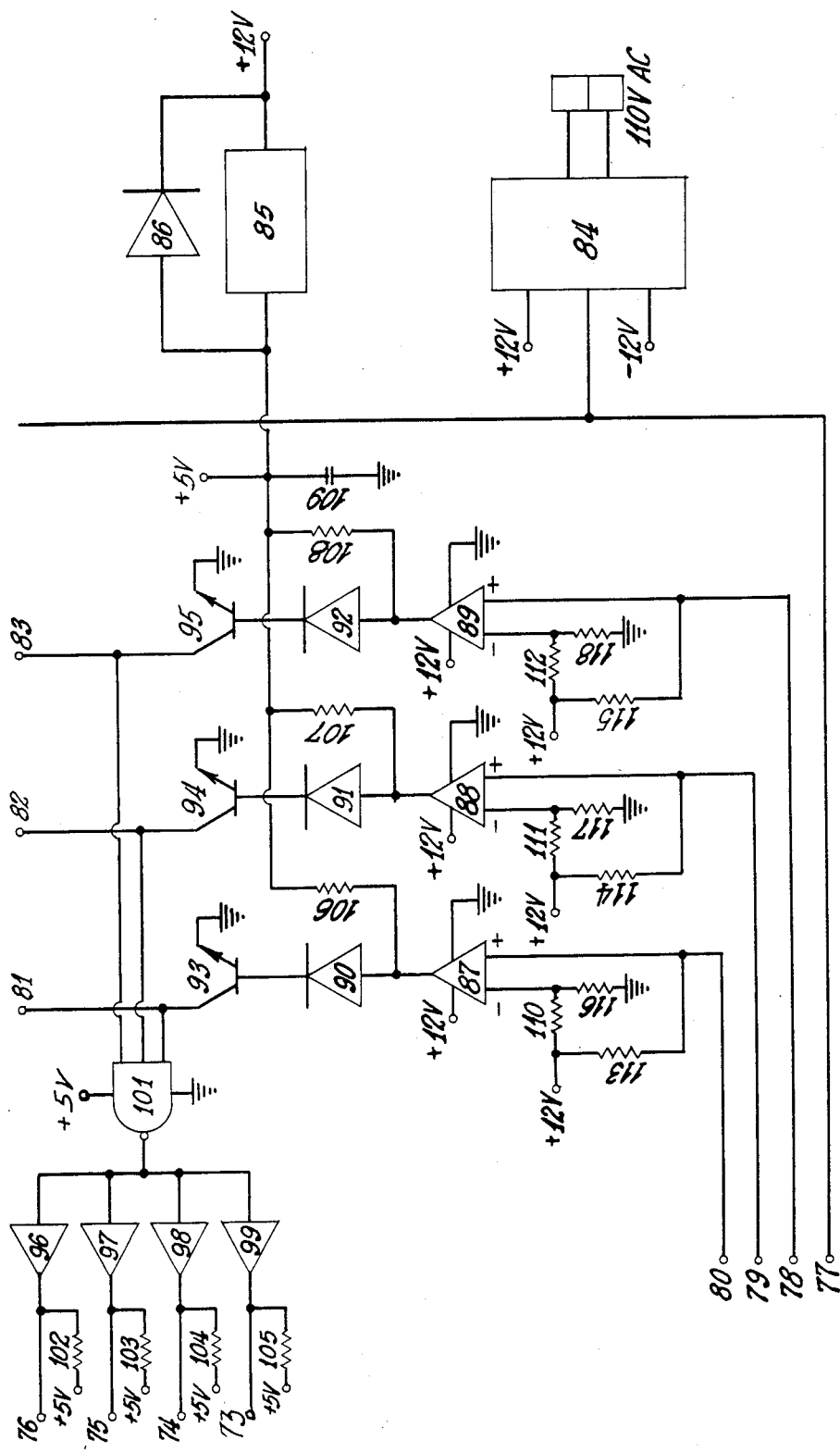
FIG. 4 shows the output circuitry for selecting which digital field device will be read.
Figure 6:
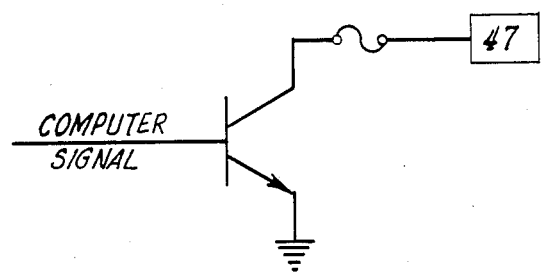
FIG. 6 shows the device which is internal to the digital receiving device which selects which digital field device will be read.

The digital receiving device has a line for each field digital device to select which field digital device will be read by the digital receiving device. The digital receiving device has a common emitter transistor output element as shown in FIG. 6. When field digital device 1 is to be selected to be read, then the digital receiving device impresses a voltage on the base of the transistor output. This causes the transistor to become conductive and the collector is pulled to ground. This ground pin 47 in FIG. 3 is connected to line 80. The other two select lines of the digital receiving device are floating above ground since no signal is applied to the base of their corresponding output transistors. Pins 48 and 49 and, hence, lines 78 and 79 are above ground potential. Referring now to FIG. 4, line 80 is connected to the node of resistor 113 and the positive input of voltage comparator 87. Voltage comparator 87 is one quarter of a Quad Voltage Computer such as a 3302 device. Resistors 113, 114 and 115 are 8-K ohm resistors which drop the +12 volt signal and impress it on the positive input of the voltage comparator when no signal is inputted to lines 78, 79 or 80. Resistors 110, 111, 112, 116, 117 and 118 are all 3 K ohm resistors and form voltage dividers such that 6 volts are impressed on the negative input of comparators 87, 88 and 89. Voltage comparators 87, 88 and 89 produce a positive voltage output when the positive input is higher than the negative input. When the potential of the negative input is at a higher potential than the positive input, then the output of the voltage comparator is grounded. In the present example, field digital device 1 has been selected and line 80 is grounded. Lines 78 and 79 are above ground potential. Since line 80 is grounded, the 12 volts dropped across resistor 113 is shunted to ground. The positive side of comparator 87 is ground potential while the negative side is still at a +6 volts. The output of comparator 87, which is connected to the node of resistor 106 and device 90, is grounded. Lines 78 and 79, however, being above ground potential allow the +12 volts which is dropped across resistors 114 and 115 to be impressed on the positive inputs of comparators 88 and 89. A positive voltage is, therefore, transmitted on the outputs of comparators 88 and 89. Resistors 106, 107 and 108 are typically 2 K ohm resistors and drop a +5 volts across them to the input anodes of diodes 90, 91 and 92. This is sufficient to cause diodes 90, 91 and 92 to be conductive. In the present example, the +5 volts dropped across resister 106 is pulled to ground due to the output of voltage comparator 87 being grounded. Diode 90 has its anode at ground and does not conduct. Diodes 91 and 92 are conductive. The cathode of diode 90 is connected to the base of common emitter wired transistor 93. Transistor 93, 94 and 95 are NPN type silicon bipolar junction transistor such as 2N2222 devices. Transistor 93 is not conductive since its base is not being fed a signal. The collector of transistor 93 and, hence, line 81 is floating above ground. Diodes 91 and 92, however, are conducting due to the +5 volts being dropped across resistors 107 and 108, respectively. The cathodes of diodes 91 and 92 are producing a signal on the bases of transistors 94 and 95. The collectors of transistors 94 and 95 are therefore grounded which makes lines 82 and 83 at ground potential.

The 12 volt supply voltages are produced by a regulated power supply 84 such as a P35-12 power supply produced by POLYTRON DEVICES, INC. The ground of this power supply is connected to line 77 which is connected to pin 50 of connector 400 as shown in FIG. 3 and connected pins 1 of connectors 100, 200 and 300 as shown in FIG. 2 for a common ground. The 5 volt supply is provided by a voltage regulator 85 such as a Model LM 340-05 produced by National Semiconductor Incorporated. A diode 86 is provided as an overvoltage protector. A 0.1 microfarad capacitor 109 is used as a filter.

Lines 81, 82 and 83 are all connected to the input of a 3 input NAND gate 101. The NAND gate gives a grounded output (zero potential) if and only if all three lines 81, 82 and 83 are high. If any of the lines 81, 82 or 83 are grounded, then the output from NAND gate 101 is high. The only way NAND gate 101 can have a grounded output is if the digital receiving device simultaneously selects all three field digital devices to read. This would cause lines 78, 79 and 80 to all be grounded. If this occurs, then the output of NAND gate 101 will be ground. Hex drivers buffers 96, 97, 98 and 99 will produce a grounded output. The +5 volts normally dropped across the 2 K ohm resistors 102, 103, 104 and 105 will be pulled to ground, and lines 73, 74, 75 and 76 will be grounded. In all other cases, lines 73, 74, 75 and 76 will have at least +5 volts imposed on them.

Referring back to FIGS. 1 and 2, line 81 is connected to pins 3, 8, 13 and 18 of connector 100. Line 82 is connected to pins 3, 8, 13 and 18 of connector 200. Line 83 is connected to pins 3, 8, 13 and 18 of connector 300. In the present example, line 81 is above ground potential. The first field digital device connected to connctor 100 will attempt to produce a valid BCD output. Lines 82 and 83 being grounded will ground pins 3, 8, 13 and 18 of connectors 200 and 300. The second and third field digital device will impress +5 volts on every one of their BCD data lines. In order to understand how the digital interface selector gates a valid BCD signal from a field digital device to the digital receiving device, we will assume that the first field digital device is attempting to transmit the number 1056. In this example, the signals present on connector 100 would be as follows. Pin 22 (BCD 1) would have +5 volts impressed on it while pins 19 (BCD 8), 20 (BCD 4) and 21 (BCD 2) would be grounded. This would indicate the number 1 in the thousands decade.

Pins 14 (BCD 8), 15 (BCD 4), 16 (BCD 2) and 17 (BCD 1) would all be grounded indicating a number zero in the hundreds decade. Pins 12 (BCD 1) and 10 (BCD 4) would have +5 volts impressed upon them while pins 9 (BCD 8) and 11 (BCD 2) would be grounded for a number 5 in tens decade. Pins 5 (BCD 4) and 6 (BCD 2) would have +5 volts impressed on them while pins 4 (BCD 8) and 7 (BCD 1) would be grounded for a number 6 in the units decade.

Figure 5:
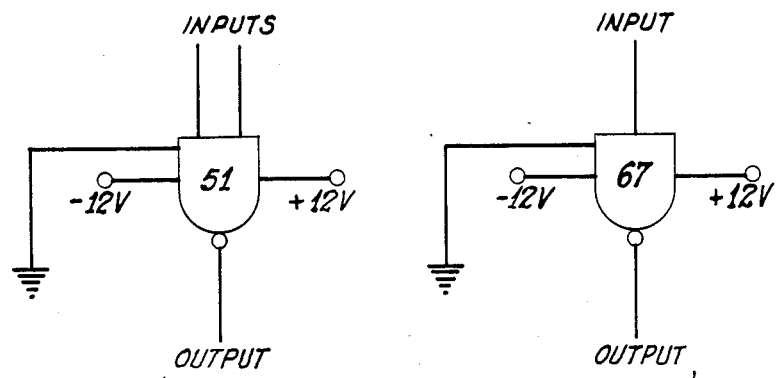
FIG. 5 shows the power connections to the output gates.

Referring to FIG. 3, a series of NAND gates are used to transfer the data to the digital receiving device. The NAND gates are portions of a Quadruple Line Driver 75188. NAND gates 51 through 66 are dual input gates while gates 67 through 72 are single input gates. The power connections to these gates are shown in FIG. 5. In our present example, the first field digital device has been selected, the four lines 73, 74, 75 and 76 have a voltage impressed on them, and the first field digital device is sending a number of 1056. The NAND gates 51 through 72 will produce a low signal if and only if all inputs are high. In all other cases, the outputs of the NAND gates will be high. In the present example, gate 51 will have a high input from line 76 and a high input from BCD 1 of the thousands decade. This will produce a low output signal on pin 25 of connector 400. Gates 52, 53, and 54 will have a high signal from lines 76 but will have low signals from lines corresponding to BCD 2, BCD 4 and BCD 8 of the thousands decade. Pins 26, 27 and 28 of connector 400 will therefore be high. The hundreds digit in our example is zero, and lines BCD 1, BCD 2, BCD 4 and BCD 8 will all be low. Line 75 is, however, impressing a high signal on gates 55, 56, 57 and 58. Pins 29, 30, 31 and 32 will all be high. The tens decade is transmitting a number 5. This causes BCD 1 leading to gate 59 and BCD 4 leading to gate 61 to be high. Line 74 is also transmitting a high signal so the output of gate 59 and, hence, pin 33 of connector 400 and the output of gate 61 and, hence, pin 35 of connector 400 will be low. BCD 2 leading to gate 60 and BCD 8 leading to gate 62 are both low. This causes the output of gate 60, which is connected to pin 34 of connector 400, and the output of gate 62, which is connected to pin 36 of connector 400, to be high. The units decade is transmittng a number 6. BCD 2 leading to gate 64 and BCD 4 leading to gate 65 are high. BCD 1 leading to gate 63 and BCD 8 leading to gate 66 are low. This causes pins 38 and 39 of connector 400 to be low and pins 37 and 40 of connector 400 to be high.

The remaining gates 67–72 act as inverters for their inputs. Gates 67, 68 and 69 are the indicators for whether the reading is above or below zero. Gates 70, 71 and 72 are the verify lines to indicate to the digital receiving device which field digital device has been selected and is sending data. Referring back to FIG. 1, NAND gate 70 is connected to line 81 of FIG. 4. This line in our example is grounded; therefore the output of gate 70, which is connected to pin 44 of connector 400, is high. The input of NAND gate 71 is connected to line 82, which is high; therefore the output of NAND gate 71, which is connected to pin 45 of connector 400, is low. Similarly, the output of gate 72, which is connected to pin 46 of connector 400, is low because its input is connected to line 82, which is high.

Pins 47, 48 and 49 of connector 400 are the lines which select which field digital device will be selected. Pin 50 is the common ground connection to the digital receiving device and is connected to line 77 of FIG. 4.

Figure 8:
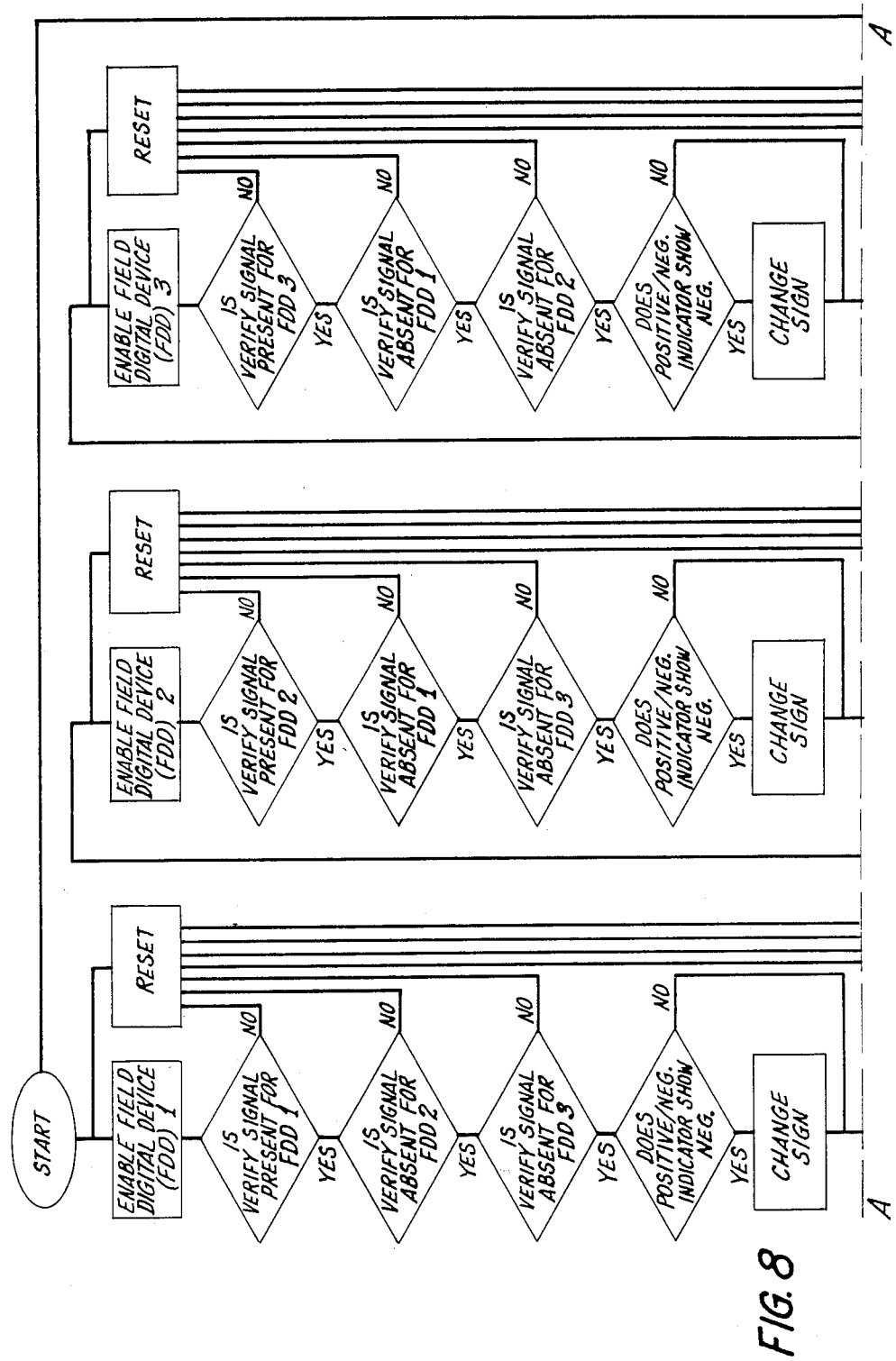
FIG. 8 is a logic diagram that the computer or digital receiving device uses to read the signals from the field digital device.
Figure 8:
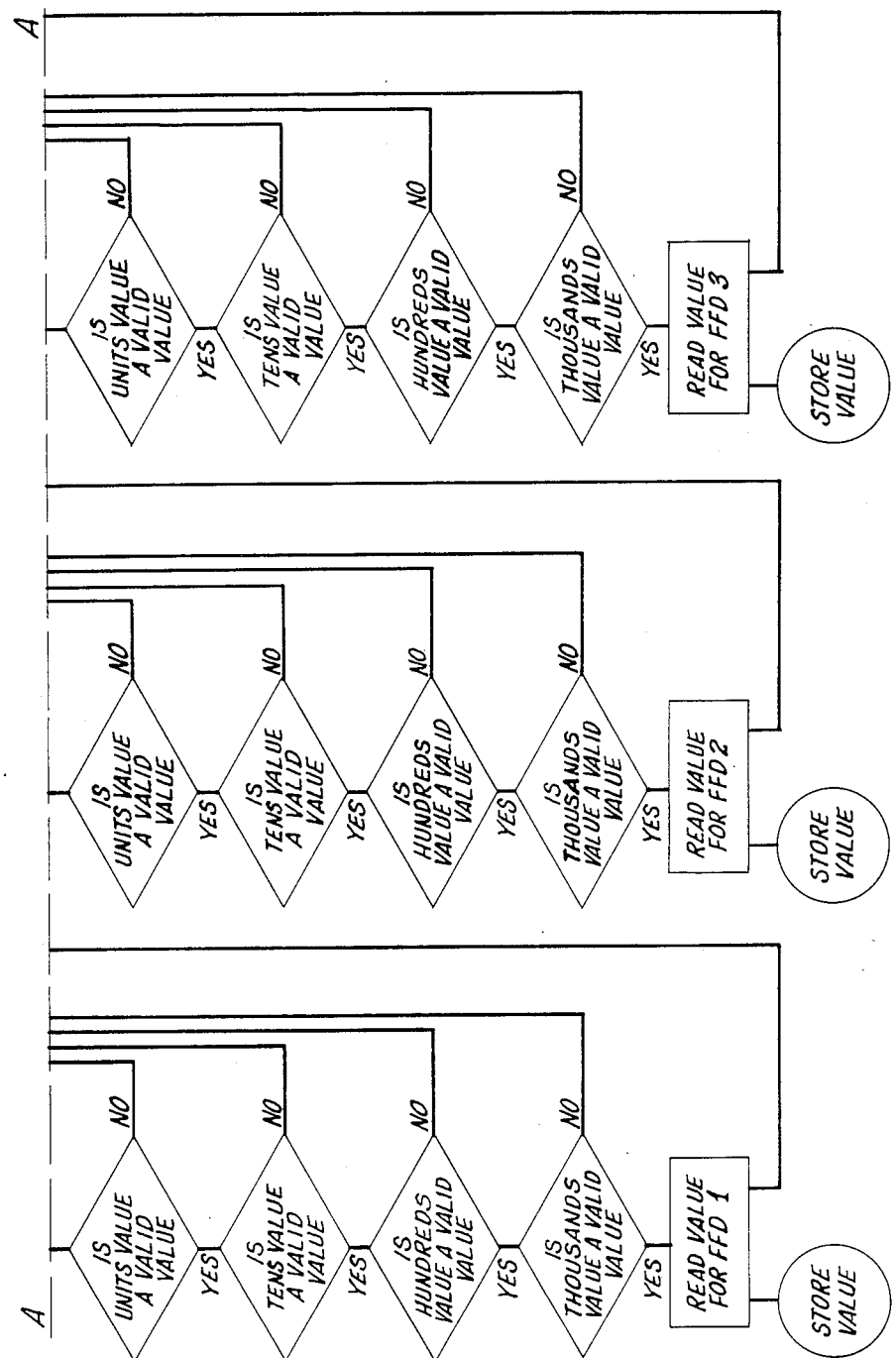

FIG. 8 is a logic diagram that the software of the digital receiving device performs in selecting a specific field digital device to read, in verifying that only one field digital device has been selected and the signal being transmitted is a valid signal.

The above discussion has been directed to three field digital devices, but one skilled in the art can see how a multitude of field digital devices can be connected. A separate select, verify and over/under zero line would need to be added for each additional device. Additional enable circuits can be added and NAND gate 101 would be replaced with a gate having the number of inputs equal to the number of field digital devices. In this manner, any number of field digital devices can be connected to the digital receiving device. While the invention has been particularly shown and described with reference to a preferred embodiment, it will be understood by those skilled in the art that the foregoing and other changes in form and details may be made therein without departing from the spirit and scope of the invention.

INDUSTRIAL APPLICABILITY

The Digital Interface Selector allows a plurality of field digital devices which transmit data with a Binary Coded Decimal output to be connected to a digital receiving device with only one set of data lines. This eliminates the necessity of having separate data lines from each field digital device to the digital receiving device.

I claim:

1. A digital interface selector for connecting a plurality of field digital devices to a digital receiving device comprising: a means for the digital receiving device to select a particular field digital device to transmit data; a means to interconnect all field digital devices; a means to verify that only one field digital device is transmitting data; software means associated with the digital receiving device to determine if the digital field device is transmitting valid data and a means to gate the valid data from the field digital devices to the digital receiving device.

2. A digital interface selector as recited in claim 1 wherein the means for connecting a plurality of field digital devices to a digital receiving device is comprised of wired AND data lines gated through NAND gates.

3. A digital interface selector as recited in claim 1 wherein the means for the digital receiving device to select the particular field digital device is a circuit comprised of a voltage comparator with a line from the digital receiving device attached to the positive input of the voltage comparator which is normally biased higher than the input, a diode and a common emitter wired transistor such that when the line from the digital receiving device is grounded the collector of the common emitter transistor is producing a voltage above ground but which in all other cases the collector of the common emitter transistor is forced to ground.

4. A digital interface connecting the output of a plurality of field digital devices to a single digital receiving device comprising: a means for selecting which field digital device is to output a signal; a means to verify that the proper field digitl device is outputting a signal; a means for combining the outputs from all field digital devices; a means for determining that the signal from the field digital device is a valid signal; and a means for gating the valid signal to the digital receiving device.

5. A digital interface selector connecting a plurality of digital transmission devices to a digital receiving device comprising: a means for selecting the particular digital transmission device which is to transmit data; a means for interconnecting all digital transmission devices; a means to verify that only one data transmission device out of a plurality of data transmission devices has been selected; and softward means associated with the digital receiving device to prevent transmission of data if more than one of the digital transmission devices have been selected.

6. A digital interface connecting the output of a plurality of field digital devices to a digital receiving device comprising:
    (a) a control circuit connecting the digital receiving device to each field digital device for selection by the digital receiving deivce of the field digital device which is to output a signal;
    (b) four data lines for each decade of data from each field digital device to transmit data from the field digital device to the digital receiving device;
    (c) a hard wired connection for each data line of a field digital device output connected to the corresponding data line of all other field digital devices; and
    (d) output gates connected on the input side to the hard wired connection for each data line and the control circuit to prevent transmission of data to the digital receiving device when the digital receiving device simultaneously selects all field digital devices to transmit data.

7. A digital interface selector connecting the output of a plurality of field digital devices to a single digital receiving device comprising:
    (a) an enable circuit line from the digital receiving device to each field digital device through a circuit which includes a voltage comparator, diode and common emitter wired transistor for selecting which field digital device is to transmit data to the digital receiving device by means of grounding an input to one of the voltage comparators;
    (b) a verify circuit for each field digital device using a NAND gate whose input is connected to the enable circuit line and whose output is connected to the digital receiving device to indicate which field digital device has been selected to transmit data;
    (c) a disable circuit using a NAND gate which has an input line for each field digital device from each enable circuit line to prevent transmission of data to the digital receiving device if all field digital devices are selected simultaneously;
    (d) four data lines for each decade of data for each field digital device wired in an AND configuration for interconnecting all field digital devices; and (e) a gating network of NAND gates leading to the digital receiving device whose first input is from and the AND wired data network and whose second input is connected to the disable circuit to allow transmission of data to the digital receiving device.

8. A method for interfacing a plurality of field digital devices to a single digital receiving device comprising the steps of:

(a) grounding a control line, which is connected through circuitry to a specific field digital device, at the digital receiving device for the field digital device which is to transmit a data signal;

(b) sending a signal from the field digital device, which is transmitting a data signal, to the digital receiving device;

(c) impressing four decades of binary coded decimal data on the data lines of the field digital device;

(d) connecting the data lines from the field digital devices in an AND wired configuration;

(e) gating the AND wired data line signals to the ditital receiving device through digital logic elements;

(f) verifying that each decade of binary data is a valid binary coded decimal number by means of software associated with the digital receiving device; and (g) reading the valid binary coded decimal numbers into the digital receiving device.

9. A method for interfacing a plurality of field digital devices to a single digital receiving device comprising the steps of:

(a) selecting a specific field digital device to transmit data by means of ground a control line at the digital receiving device;

(b) sending from the selected field digital device a signal to the digital receiving device to verify that the field digital device is sending data;

(c) sending four binary bits for each data decade in binary coded decimal format from the field digital device to the digital receiving device;

(d) connecting each data line from all of the field digital devices in an AND wired configuration;

(e) gating the AND wired data line signals to the digital receiving device through digital logic elements;

(f) verifying that the signals from the digital logic elements are valid binary coded decimal numbers for each decade by means of software associated with the digital receiving device; and (g) reading the valid binary coded decimal data into the digital receiving device.

* * * * *